US009356931B2

(12) United States Patent
Ekman et al.

(10) Patent No.: US 9,356,931 B2
(45) Date of Patent: May 31, 2016

(54) METHODS AND APPARATUSES FOR SECURE END TO END COMMUNICATION

(71) Applicant: Hitech & Development Wireless Sweden AB, Kista (SE)

(72) Inventors: Per Ekman, Kista (SE); Anders Grahn, Kista (SE); Pär Bergsten, Kista (SE)

(73) Assignee: Hitech & Development Wireless Sweden AB, Kista (SE)

(*) Notice: Subject to any disclaimer, the term of this patent is extended or adjusted under 35 U.S.C. 154(b) by 51 days.

(21) Appl. No.: 14/154,723

(22) Filed: Jan. 14, 2014

(65) Prior Publication Data

US 2015/0006892 A1    Jan. 1, 2015

(30) Foreign Application Priority Data

Jun. 27, 2013  (SE) .................................. 1350788

(51) Int. Cl.
*H04L 29/06* (2006.01)

(52) U.S. Cl.
CPC ........ *H04L 63/0869* (2013.01); *H04L 63/0428* (2013.01); *H04L 63/061* (2013.01); *H04L 63/168* (2013.01)

(58) Field of Classification Search
CPC .............. H04L 63/0869; H04L 9/3273; H04L 2209/80; H04L 63/0823; H04W 12/06

USPC ........................................................ 713/169
See application file for complete search history.

(56) References Cited

U.S. PATENT DOCUMENTS

| 2004/0096063 | A1  | 5/2004  | Carroni et al. |
| 2005/0251680 | A1* | 11/2005 | Brown et al. .................. 713/171 |
| 2006/0034456 | A1* | 2/2006  | McGough ........................ 380/30 |
| 2011/0280400 | A1* | 11/2011 | Chung ........................... 380/262 |
| 2012/0065802 | A1* | 3/2012  | Seeber et al. ................. 700/295 |
| 2012/0089951 | A1* | 4/2012  | Cassidy ......................... 715/854 |

FOREIGN PATENT DOCUMENTS

WO    WO-2011149765 A2    12/2011

OTHER PUBLICATIONS

Swedish Office Action dated Mar. 3, 2014 issued in corresponding Swedish Application No. 1350788-4.

* cited by examiner

*Primary Examiner* — Kambiz Zand
*Assistant Examiner* — Stephen Sanders
(74) *Attorney, Agent, or Firm* — Harness, Dickey & Pierce, P.L.C.

(57) ABSTRACT

The present invention relates to application-level secure end-to-end communication. Specifically it relates to methods apparatuses and computer program products for creating and distributing a shared secret and to sending or receiving messages between an embedded device and a user device via a cloud server.

18 Claims, 4 Drawing Sheets

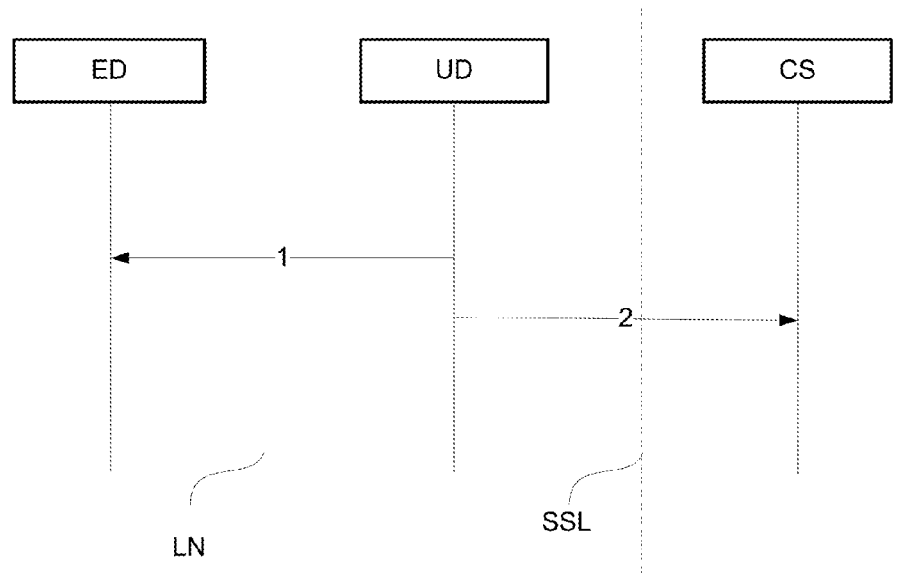
Figure 5
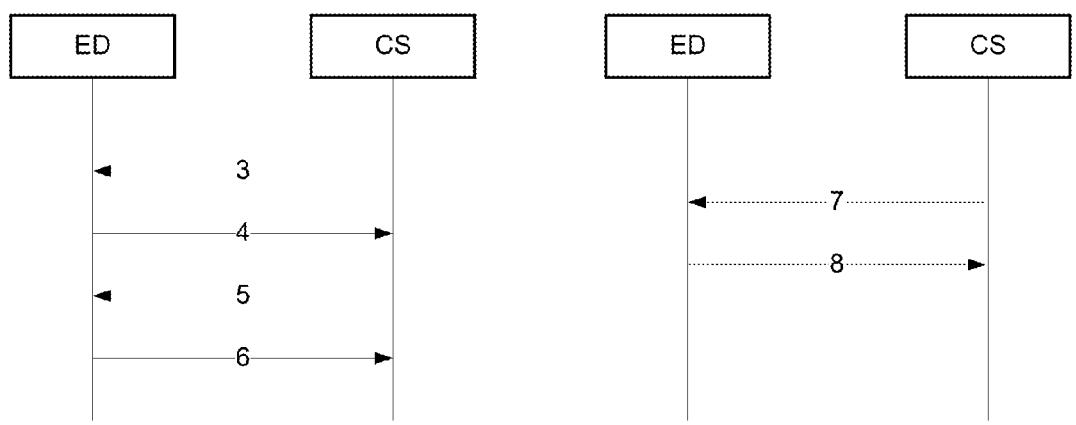
Figure 6                     Figure 7

METHODS AND APPARATUSES FOR SECURE END TO END COMMUNICATION

TECHNICAL FIELD

This application claims priority to Sweden Patent Application No. SE 1350788-4 which has a filing date of Jun. 27, 2013, the entire contents of which are incorporated herein by reference.

The present invention relates to secure messaging between a user device and a resource constrained device embedded in an appliance. Particularly, it relates to interrelated methods, embedded devices, user devices and cloud servers configured to perform secure messaging sessions according to an application level security protocol.

BACKGROUND

In general there are high requirements on authentication, integrity and confidentiality in relation to applications for personal and private use.

Specifially, in relation applications directed towards children, such as devices embedded in toys, safety and security issues are even more important.

While advanced user devices such as mobile phones, especially so called smart phones, may provide full end-to-end security provided by e.g. a Public Land Mobile Network, end devices such as embedded devices accessing/connecting via a local network such as e.g. WiFi do not have access to the security infrastructure provided by e.g. a PLMN for the last leg between an access point and the end device.

Further, the system must be stable and easy to use, partly because the user interface in an embedded device has limited capabilities, and partly because the user may have limited dexterity or ability to assimilate or utilize written instructions, such as a written manual.

By means of a user device such as e.g. smart phone, a personal computer, PC, or a tablet PC, a user can communicate with another user over a communication channel that is encrypted, end-to-end. Such user devices have significant processing and memory capabilities and can therefore use existing enterprise-class solutions for secure communication. Authentication methods used in such solutions are usually based on certificates.

Appliances in a home, e.g. toys, sensors or white goods could benefit from communicating with servers on the Internet in a secure way since data to be transferred may be sensitive. However, embedded communication devices in such appliances usually have far too low processing and or memory capability to implement existing solutions.

Some appliances are battery-powered, and therefore the communication time must be minimized to ensure that the power consumption is kept at minimum level. Another reason for minimizing power consumption is the need to reduce the generation of heat in cases where an embedded device is embedded within an appliance in relation to which heat generation is inconvenient or even unsafe, such as soft toy.

SUMMARY

It is the object to obviate at least some of the above advantages and provide improved methods apparatuses and compiter media products avoiding the above related drawbacks.

A first aspect of the invention is a method in a user device connectable to a cloud server and an embedded device. the method of the first aspect comprises creating a shared secret among the cloud server (CS) and the embedded device (ED) through generating (1010) a first key (KEY);

sending (1020) the first key (KEY) to the embedded device (ED); and sending (1030) the first key (KEY) to the cloud server (CS).

Sending the first key to the embedded device according to the first aspect may further comprise sending the first key over a local network connecting the user device and the embedded device.

The local network may be an IEEE 802.11 network and the embedded device may be IEEE 802.11 compliant.

A second aspect of the present invention is a method in a cloud server connectable to a user device and an embedded device. The method of the second aspect comprises receving a first key from the user device, the first key being a shared secret, shared with the embedded device;

using the first key to perform an initial mutual authentication between the embedded device and the cloud server;

initiating a messaging session with the cloud server; and sending or receiving a message to the cloud server.

A third aspect of the present invention is method in an embedded device connectable to a user device and a cloud server. The method of the third aspect comprises receiving a first key from the user device, the first key being a shared secret, shared with the cloud server;

using the first key to perform an initial mutual authentication between the embedded device and the cloud server;

initiating a messaging session with the cloud server; and sending or receiving a message to the cloud server.

In the method of the third aspect, the step receiving the first key to the embedded device may further comprise receiving the first key over a local network connecting the user device and the embedded device.

In a method of the second or third aspect of the invention the step of initiating a messaging session may further comprise:

creating a second key; and creating a third key, that is different from the second key.

The second and third keys may be different from the first key.

In a method of the second or third aspect of the invention, the step of sending or receiving a message may further comprise computing a first digest from a first set of parameters comprising the second key.

In a method of the second or third aspect of the invention, the step of sending or receiving a message may further comprise computing a second digest from a second set of parameters comprising a header of the message and a payload of the message.

In a method of the second or third aspect of the invention the step of sending or receiving a message may further comprise computing an encrypted payload from a third set of parameters comprising the third key.

In a method of the second or third aspect of the invention, the first digest may be a message authentication code, MAC.

In a method of the second or third aspect of the invention, the first set of parameters may further comprise a header of the message.

In a method of the second or third aspect of the invention, the second digest may be a message integrity code, MIC.

In a method of the second or third aspect of the invention, the third set of parameters may further comprise a payload of the message.

In a method of the second or third aspect of the invention, the step of sending or receiving a message may further comprise sending the first digest, the second digest and the encrypted payload, such that if sent by the cloud server to the embedded device, the second digest is sent after the encrypted payload.

A fourth aspect of the invention is a computer program product comprising a computer-readable medium with instructions for causing a programmable computer to perform a first, second or third aspect of the invention.

A fifth aspect of the invention is an embedded device connectable to a local network. The embedded device of the fifth aspect comprises a processor, a memory, a transmit-receive unit and a network interface configured to communicate over the local network. Said processor and memory may be configured to implement application enabling functions necessary to perform the method steps of the third aspect of the invention.

In order to limit certain properties of the embedded device of the fifth aspect, the embedded device may not comprise a hardware accelerator.

Such properties to be limited may be e.g. physical size, heat generation, processing capacity and/or memory capacity.

A sixth aspect of the invention is a cloud server. The cloud server comprises a processor, a memory and a network interface, and further all components necessary to perform aspects of the present invention.

The network interface may also provide connectivity to any other network necessary to implement aspects of the present invention, such as connectivity to e.g. the Internet. Said processor and memory may be configured to implement application enabling functions necessary to perform the method steps of the second aspect of the invention.

A seventh aspect of the invention is a user device. The user device comprises a processor, a memory, a radio transceiver a network interface and a user interface. The network interface provides connectivity to a Public Land Mobile Network, PLMN, which may be e.g. a GSM or WCDMA network or a network according to any other mobile telephony standard as specified by e.g. 3GPP or any other standardisation body. The network interface may also provide connectivity to any other network necessary to implement aspects of the present invention, such as connectivity to a Local Network and directly or indirectly to the Internet. Said processor and memory may be configured to implement application enabling functions necessary to perform the method steps of the first aspect of the invention.

BRIEF DESCRIPTION OF THE DRAWINGS

In order to explain the invention in more detail, one embodiment will be described in detail below, reference being made to the accompanying drawings, in which

FIGS. 5, 6 and 7 are sequence diagrams illustrating aspects of the invention.

DETAILED DESCRIPTION

Aspects of the invention provides the advantages of enabling end-to-end security on application level, even to a device with very limited processing and memory capacity and/or which does not, or may not be able to comprise a hardware accelerator.

Figure 1:
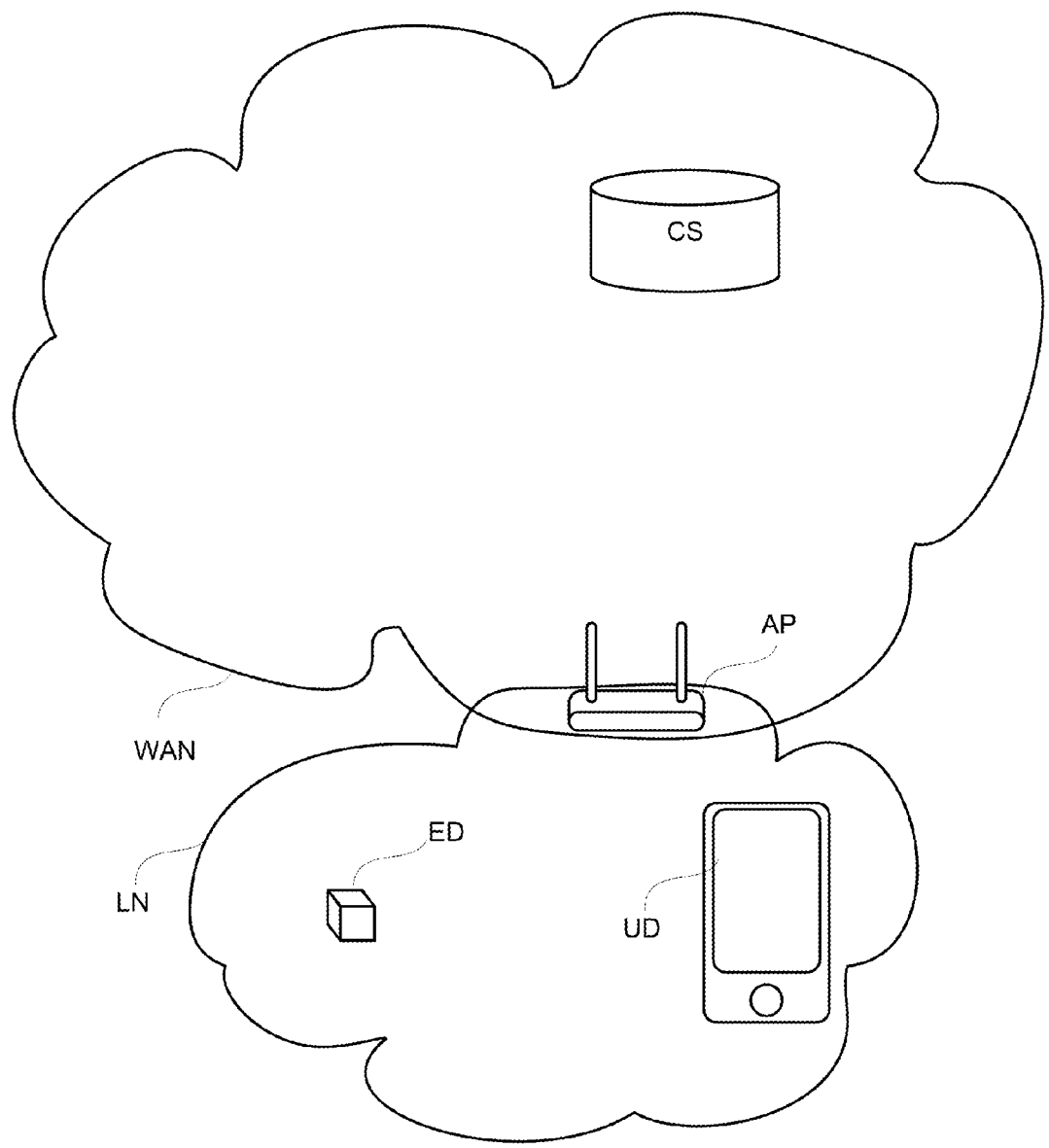
FIG. 1 is an overview of a system in which aspects of the invention are implemented.

A system in which the present invention is implemented will now be described in relation to FIG. 1.

The system comprises a Wide Area Network, WAN, or backbone network, such as e.g. the Internet. A Public Land Mobile Network, PLMN, may be adapted and configured to communicate with and via the WAN. In the system, a Local Network, LN, may be connected to the WAN. The Local Network may be a Wireless Local Network, and may be connected to the WAN via access points APs, and the system may comprise a first access point AP and a first local network LN.

The local network LN may be an IEEE 802.11 network, an IEEE 802.15.4 or ZigBee network, a Near Field Communication, NFC, network, or any other type of local, short-range, network that may provide a bridge to the WAN or Internet.

The system further comprises a user device UD. Exemplary embodiments of the system comprise a user device UD that may be connectable to the wide area network WAN directly, via a global radio access network comprised in Public Land Mobile Network or via a local network LN, or may be connectable via any combination of applicable WAN access methods.

According to exemplary embodiments the user device UD is a so called smart mobile telephone or "smart phone".

Figure 2:
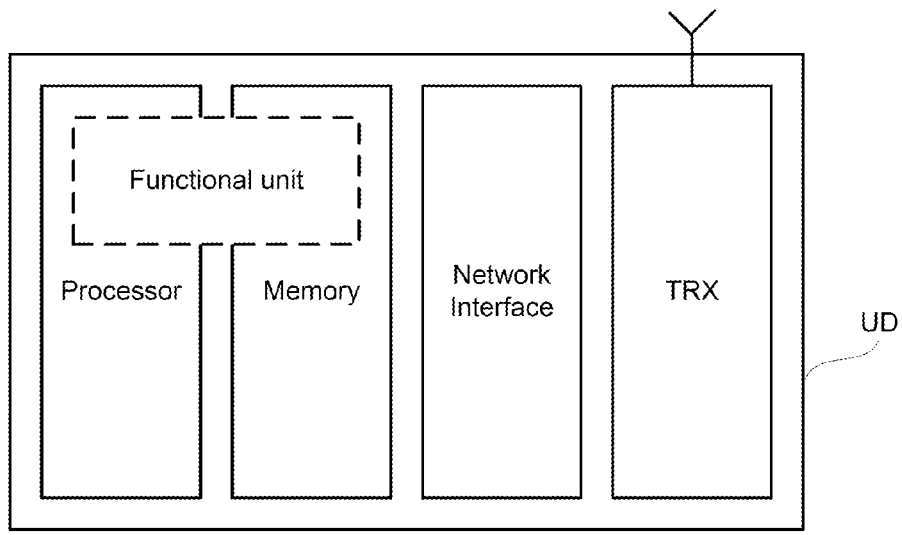
FIG. 2 is a schematic illustration of a user device according to embodiments of the invention.

An exemplary embodiment of a user device UD will be described in relation to FIG. 2. The exemplary user device UD comprises a processor, a memory, a radio transceiver, TRX, a network interface and a user interface. The network interface provides connectivity to the Public Land Mobile Network, PLMN, which may be e.g. a GSM or WCDMA network or a network according to any other mobile telephony standard as specified by e.g. 3GPP or any other standardisation body. The network interface may also provide connectivity to any other network necessary to implement aspects of the present invention, such as connectivity to the Local Network e.g.

By way of the processor and the memory, application enabling functions may be implemented as a function unit comprised in the user device UD. In FIG. 2 this is schematically illustrated through the dashed-line box overlaid onto the processor and memory.

In certain embodiments, the user device UD may itself constitute an access point to a Local Network.

The system further comprises a network server, for the purpose of this patent application also interchangeably referred to as cloud server, CS. The network server provides a multitude of application enabling functionalities to the system, including enabling communication between the user device UD and an embedded device, ED, further described below. An exemplary embodiment of the cloud server, CS, is described in relation to FIG. 3. The exemplary cloud server CS comprises a processor, a memory and a network interface, and further all components necessary to perform aspects of the present invention.

The network interface may also provide connectivity to any other network necessary to implement aspects of the present invention, such as connectivity to e.g. the Internet.

Figure 3:
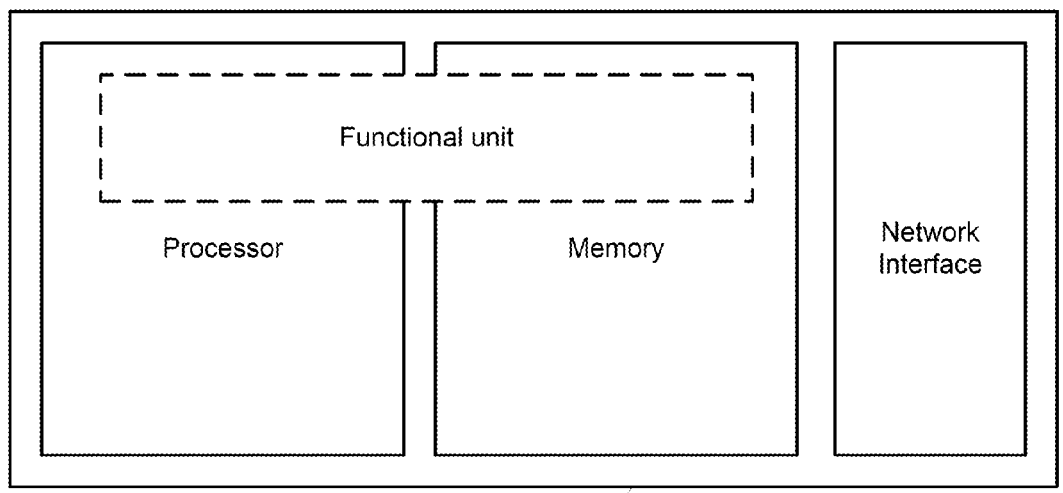
FIG. 3 is a schematic illustration of a cloud server according to embodiments of the invention.

By way of the processor and the memory, any application enabling function may be implemented as a function unit comprised in the cloud server. In FIG. 3 this is schematically illustrated through the dashed-line box overlaid onto the processor and memory. Though only one such function unit is displayed in each of the schematic overviews of FIGS. 2, 3 and 4, embodiments of each aspect of the invention may comprise multiple such application enabling function units.

The cloud server CS may be adapted and configured to implement e.g. application enabling database functions, and storage for content that a user may wish to send to or from an embedded device ED or a user device UD comprised in the system.

The system further comprises an embedded device, ED, embeddable in an appliance. For the purpose of this patent application the device embeddable in an appliance is interchangeably referred to as an embedded device ED or a box.

Figure 4:
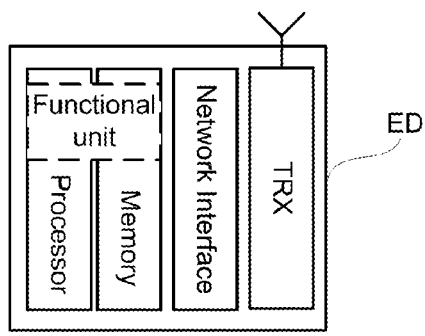
FIG. 4 is a schematic illustration of an embedded device according to embodiments of the invention.

An exemplary embodiment of an embedded device, ED, will be described in relation to FIG. 4. The exemplary embedded device ED comprises a processor with limited capacity in comparison with a processor comprised in a user device to which the embedded device is connectable via a local network LN, a memory with limited capacity in comparison with a memory comprised in the user device to which the embedded device is connectable, a radio transceiver and a limited user interface, which comprises at least a speaker, and a microphone. The embedded device ED may further comprise or be connectable to a tactile input device such as e.g., a button. The embedded device ED may further comprise or be connectable to a light signal output device, such as e.g. a light diode.

The embedded device ED is connectable to the local network, and, via the local network further connectable to the WAN, this by virtue of methods according to aspects of the present invention.

In order to reduce e.g. heat generation, the embedded device ED is subject to restraints in terms of power consumption, physical space, processing capacity and memory capacity. These restraints make it e.g. difficult to implement a full Secure Sockets Layer, SSL, stack in the embedded device ED.

The mobile device UD comprises a full Secure Sockets Layer, SSL, stack and therefore supports de-facto standards for secure communication over the Internet. The embedded device ED has limited memory and therefore needs a custom method for authentication, integrity and encryption.

Through aspects of the present invention, the embedded device ED does not need a hardware accelerator. Hence, embedded devices according to certain embodiments of the present invention do not comprise a hardware accelerator.

Mobile Device Authentication

The mobile device UD uses SSL when communicating with the cloud server CS. The user of the mobile device UD may select a publically available identity provider, such as a social media services provider or a search engine services provider to authenticate to the cloud server. The mobile device UD will register the user, the mobile device UD and the embedded device ED with the Cloud Server.

Box and Cloud Server Authentication

The box ED and the cloud server CS have a shared secret, a first key, KEY. This secret key, KEY, is distributed by the mobile phone UD. The security features used by the box ED to authenticate to the cloud server CS is described further below.

Figure 8:
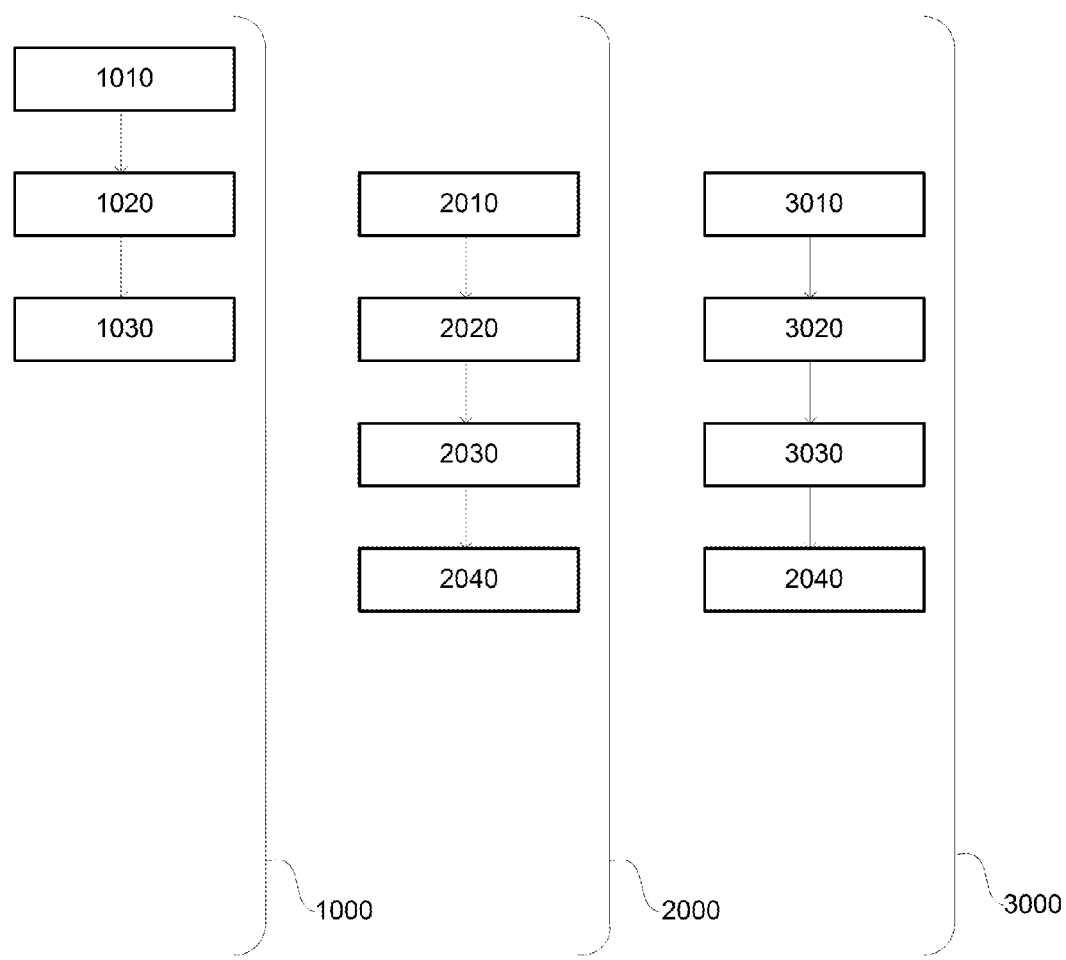
FIG. 8 are flow charts of embodiments of aspects of the invention.

Distribution of a shared secret key, KEY, will now be illustrated in relation to FIG. 5, and further with reference to method steps as illustrated by FIG. 8.

Upon configuration of the box ED, the mobile device UD will generate 1010 a first secret key, KEY, that the box ED may use in order to communicate with the cloud server. The arrow 1 illustrates how the first key KEY is transmitted 1020 from the mobile device UD to the box. The first key KEY is sent over the local network LN connection, illustrated by a fine-dashed line.

The first secret key KEY is stored in a local parameter database comprised in the box.

As illustrated by the arrow 2, the first key KEY is then also transferred 1030 from the mobile device UD to the cloud server CS using the secure SSL connection.

The first key KEY will be stored in a database comprised in the cloud server CS and will be used for the authentication, message digest and payload encryption of messages transferred during the box ED to cloud server CS communication. However, the first key KEY is used only indirectly to derive digest and encryption. This is further described below.

For the purpose of clarification, within the system, a message can be sent e.g. from the user device UD, or from another device that is not the cloud server. For the purpose of this patent application, such a message is referred to as a global message:

global message=HDR:TEXT and comprises a header HDR and payload TEXT. The payload TEXT may be anything that a user of the system wishes to send to the box, such as a voice message or a piece of music, or some other content.

In relation to FIGS. 5 and 6 below, the references HDR and TEXT refers to header and payload of such global messages while the messages as indicated by arrows in FIGS. 5 and 6 are application enabling local messages according to an application-specific protocol enabled through aspects of the present invention.

An authentication sequence 2020, 3020, will be described in relation to FIG. 5, and comprises the following steps, the numbering corresponding to respective arrows in the sequence diagram.

3. The cloud server CS sends an authentication request message to the box. A first challenge, C1, is comprised with the authentication request message.

The box ED saves the received first challenge, C1, in its local memory.

In the box, a digest $H1_{Box}$ is calculated using the HMAC function with the shared secret key KEY and a concatenation of the first challenge C1 and the box's hardware identification, ID as parameters, according to the following:

$H1_{Box}$=HMAC(KEY, C1:ID).

4. The box ED sends an authentication reply message to the cloud server. A set of parameters is comprised in the authentication reply message. The set of parameters comprises a second challenge C2, the digest $H1_{Box}$, and the box's hardware identification ID.

The cloud server CS saves the second challenge C2 in a local memory and computes a digest $H1_{Cloud\ Server}$ according to $H1_{Cloud\ server}$=HMAC(KEY, C1:ID)

The cloud server CS then compares $H1_{Box}$ and $H1_{Cloud\ Server}$. If the digests differ then the box ED has failed to authenticate itself to the cloud server, and the cloud server CS will therefore disconnect the box.

If the digests match, however, the cloud server CS will calculate another digest $H2_{cloud\ server}$ according to $H2_{Cloud\ server}$=HMAC(KEY, C2:ID).

5. An authentication request message is sent from the cloud server CS to the box. The sent message comprises the parameter $H2_{Cloud\ Server}$.

The box ED computes $H2_{Box}$ and compares $H2_{Box}$ and $H2_{Cloud\ Server}$. If they differ then the cloud server CS has failed to authenticate itself to the box, and the box ED will disconnect.

6. If the digests match, then the mutual authentication is completed.

The cloud server CS on the Internet is easy to identify, locate and address with satisfactory security. The embedded device ED, however, may be a nomadic device, and may have the need to connect from different locations.

Hence, for methods according to certain embodiments of the present invention, the box ED uses its hardware identity, ID, as identification.

If any step fails during the authentication a disconnection will be performed by the node that discovered the error, e.g. non-matching digest, and the authentication has to start over next time the box ED connects to the cloud server.

C1 and C2 should be randomly selected. They should further be different for each session.

Messaging may only start when the mutual authentication is completed.

In a messaging session initiation step 2030, 3030, a second key, a session key SKEY is used to compute the digest for the message headers. A keyed-hash message authentication code, HMAC, may be used to calculate a message authentication code, MAC, involving a cryptographic hash function in combination with the shared secret key KEY.

The first and second challenges C1, C2 and the boxes hardware id ID are concatenated into one parameter C1:C2:ID. The session key is then calculated 2032, 3032 accordingly, SKEY=HMAC(KEY, C1:C2:ID). The session key SKEY is derived from the parameters C1 and C2, and is therefore unique for each session. Further if the system comprises multiple boxes, the session key SKEY is unique for each box. If a brute-force attack reveals a session key SKEY, the first, secret, key KEY will not be compromised.

The messaging session initiation step 2030, 3030 further comprises a step where a third key, an encryption key XKEY, is created 2034, 3034, calculated as XKEY=HMAC(KEY, SKEY).

The encryption key XKEY will be used to encrypt the payload TEXT. The encryption key XKEY is created 2034, 2034 such that it can be used in relation to an encryption algorithm that requires comparatively less processing power than the messaging session authentication algorithm. The RC4 algorithm may be used for such encryption.

The encryption key XKEY is generated from the shared secret key KEY and the session key SKEY but since a keyed-hash message authentication code, HMAC, function is a non-reversible function, the session key SKEY may not be derived from the encryption key XKEY.

The box ED and the cloud server CS may increment the challenges C1 and C2 for each message, and include them in the HMAC calculation, in order to prevent replay-attacks.

The second challenge C2 may be incremented C2+ by the cloud server CS before sending a request. C1 may be incremented C1+ by the box ED before sending a confirmation or an event.

A messaging sequence 2040, 3040 will now be described in relation to FIG. 7.

A first digest, a message authentication code, MAC, is computed 2042 based on the session key SKEY and a concatenation of a header HDR of the message, an incremented challenge C2+ and the box ED hardware id ID according to the following:

$MAC_{Cloud\ server}$=HMAC(SKEY, HDR:C2+:ID).

Any payload will be encrypted by using the encryption key XKEY=HMAC(KEY, SKEY). An encrypted payload XTEXT may be derived on the basis of the encryption key XKEY and the unencrypted payload, TEXT. The RC4 may be used according to the following: RC4(XKEY, TEXT).

A second digest, a message integrity check, MIC, of the original, non-encrypted, header and payload will be created 2044, calculated according to:

$MIC_{Cloud\ Server}$=FMIC(HDR:TEXT), where FMIC is a function through with the MIC is calculated.

7. The cloud server CS sends a message to the box. The sent message comprises the parameters $MAC_{Cloud\ Server}$, XTEXT and $MIC_{Cloud\ Server}$.

8. The Box ED receives the message.

The box ED then computes 3042 a first digest, $MAC_{Box}$, corresponding to the first digest $MAC_{Cloud\ Server}$.

The digests $MAC_{Box}$ and $MAC_{Cloud\ Server}$ are compared. If the two digests are not identical, then the message authentication has failed and the box ED will disconnect. If the digests match, then the box ED will decrypt the payload and compute 3044 the MIC for the header and payload.

$MIC_{Box}$ and $MIC_{Cloud\ Server}$ are compared. If the MIC matches, the box ED will respond and set the digest to HMAC (SKEY, HDR:C1+:ID). Any payload will be encrypted; RC4 (XKEY, TEXT). The MIC of the original, non-encrypted, header and payload will be set; MIC=FMIC(HDR:TEXT).

If any step fails during the messaging, a disconnection will be performed by the node that discovered the non-matching digest, and the authentication has to start over next time the box ED connects to the cloud server.

The security relies on that the first key KEY is not compromised. According to embodiments of the invention the following may apply.

The first key KEY may be a 256-bit key. The first key KEY may be randomly generated by the mobile device UD during key distribution. This may make a brute-force attack non-feasible on the HMAC.

The first key KEY may only be used directly for the HMAC during the initial authentication steps 2020, 3020. All other messages use a session key SKEY.

Payload encryption 2046, 3046 uses a session key SKEY and a challenge, which may be incremented.

The key XKEY used for encryption of the payload cannot be used to compute the digest.

The mobile device UD can change the secret key, KEY, at regular intervals without any user-intervention.

The incremented challenge prevents replay attacks.

The MIC of message header HDR and clear-text TEXT, e.g. non-encrypted payload ensures that the encryption key XKEY is correct and that the payload really belongs to the header. Otherwise a man-in-the-middle could replay a captured payload attached to another header.

Mutual authentication prevents non-authorised cloud servers or non-authorized boxes to impersonate authorized cloud servers CSs and boxes EDs.

To support implementation with minimal resources, any MIC that include the payload TEXT or the encrypted payload XTEXT may be sent after the payload, and not in the message header. This allows the processing unit comprised in the embedded device ED to compute the MIC during transferring of the payload between the cloud server CS and the embedded device ED.

Application software enabling methods according to the present patent application may be downloadable to and installable on a mobile device UD from an Internet-based digital distribution platform for application software.

The application software may be provided as a functional unit of an operating system on a personal computer, smart phone, or tablet PC.

The header digest algorithm may be SHA-1. The digest may be computed according to the HMAC function as defined in RFC2104.

ADLER32 may be used as FMIC, in order to produce the message integrity check, MIC.

RC4 may be used as the payload encryption algorithm. Challenges C1, C2, C1+, C2+, etc, may be 128-bit challenges.

The invention claimed is:

1. A method for a user device connectable to a cloud server and an embedded device, the method comprising:
generating, by the user device, a first key for creating a shared secret between the cloud server and the embedded device;
sending, over a local network connection inaccessible to unauthorized devices, the first key, from the user device to the embedded device; and
sending, using a Secure Sockets Layer connection, the first key from the user device to the cloud server.

2. A method for a cloud server connectable to a user device and an embedded device, the method comprising:
receiving, by the cloud server, a first key from the user device, the first key being a shared secret that is shared with the embedded device;
performing an initial mutual authentication between the embedded device and the cloud server using the first key;
initiating a messaging session with the embedded device using a second key that is based on the first key; and
sending a message to the embedded device using a third key that is based on the first key and the second key.

3. A method for an embedded device connectable to a user device and a cloud server, the method comprising:
receiving, by the embedded device over a local network connection inaccessible to unauthorized devices, a first key from the user device, the first key being a shared secret that is shared with the cloud server;
performing an initial mutual authentication between the embedded device and the cloud server using the first key;
initiating a messaging session with the cloud server using a second key that is based on the first key; and
receiving a message from the cloud server using a third key that is based on the first key and the second key.

4. The method according to claim 2, wherein the initiating a messaging session further comprises:
generating the second key; and
generating the third key.

5. The method according to claim 4, wherein the sending a message further comprises:
computing a first digest from a first set of parameters that includes the second key;
computing a second digest from a second set of parameters that includes a header of the message and a payload of the message; and
computing an encrypted payload from a third set of parameters that includes the third key.

6. The method according to claim 5, wherein the first digest is a message authentication code, MAC.

7. The method according to claim 5, wherein the first set of parameters includes the header of the message.

8. The method according to claim 5, wherein the second digest is a message integrity code, MIC.

9. The method according to claim 5, wherein the third set of parameters includes the payload of the message.

10. The method according to claim 2, wherein the sending a message further comprises sending the first digest, the second digest and an encrypted payload, such that the second digest is sent after the encrypted payload.

11. A non-transitory computer-readable medium with instructions for causing a programmable computer to perform the method of claim 1.

12. An embedded device connectable to a local network, said embedded device comprising:
a processor;
a memory;
a transmit-receive unit; and
a network interface configured to communicate over the local network using the transmit-receive unit, said processor and said memory being configured to implement application specific functions to perform the method according to claim 3.

13. The embedded device according to claim 12, wherein said embedded device does not include a hardware accelerator.

14. The method according to claim 2, wherein the performing an initial mutual authentication includes:
sending a first authentication request that includes a first challenge; and
receiving a first authentication response that includes a second challenge, an identification of the embedded device, and a first digest computed using the first key.

15. The method according to claim 14, wherein the performing an initial mutual authentication includes:
sending a second authentication request that includes a second digest computed using the first key, the identification, and the second challenge; and
receiving a second authentication response to establish the initial mutual authentication.

16. The method according to claim 15, wherein the sending a message includes:
sending a message authentication request that includes a third digest computed using the second key and a third challenge; and
receiving a message authentication response that includes a fourth digest computed using the second key and a fourth challenge.

17. The method according to claim 16, wherein the third challenge is an incremented version of the second challenge, and the fourth challenge is an incremented version of the first challenge.

18. The method according to claim 16, wherein the third digest and the fourth digest are further computed using a header of the message and the identification.

* * * * *